3,535,734
Patented Oct. 27, 1970

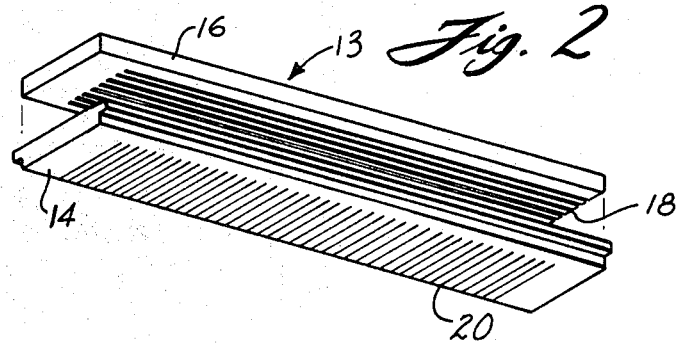
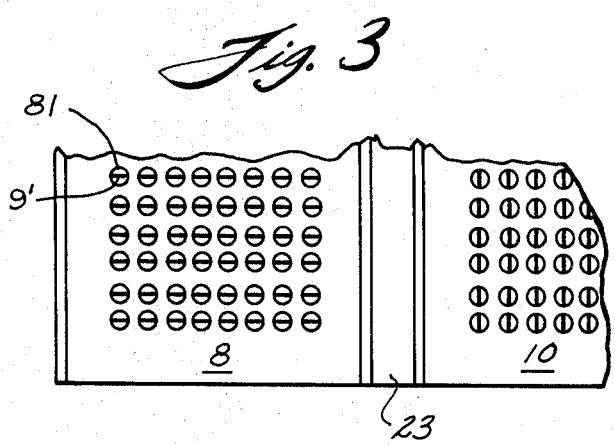
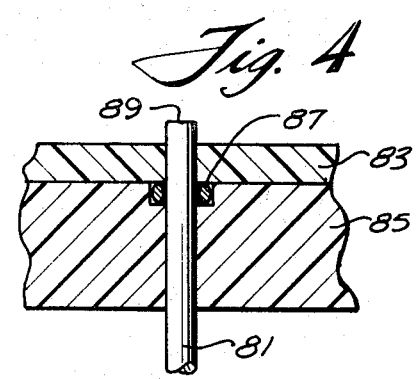
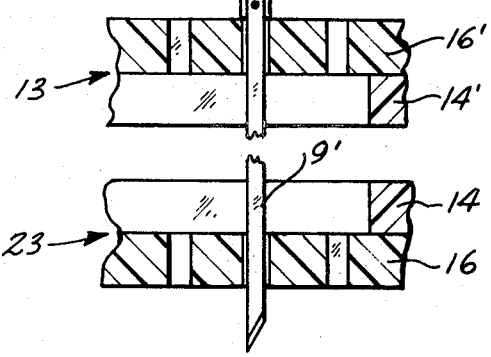
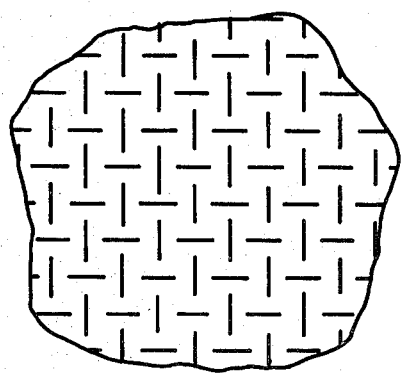

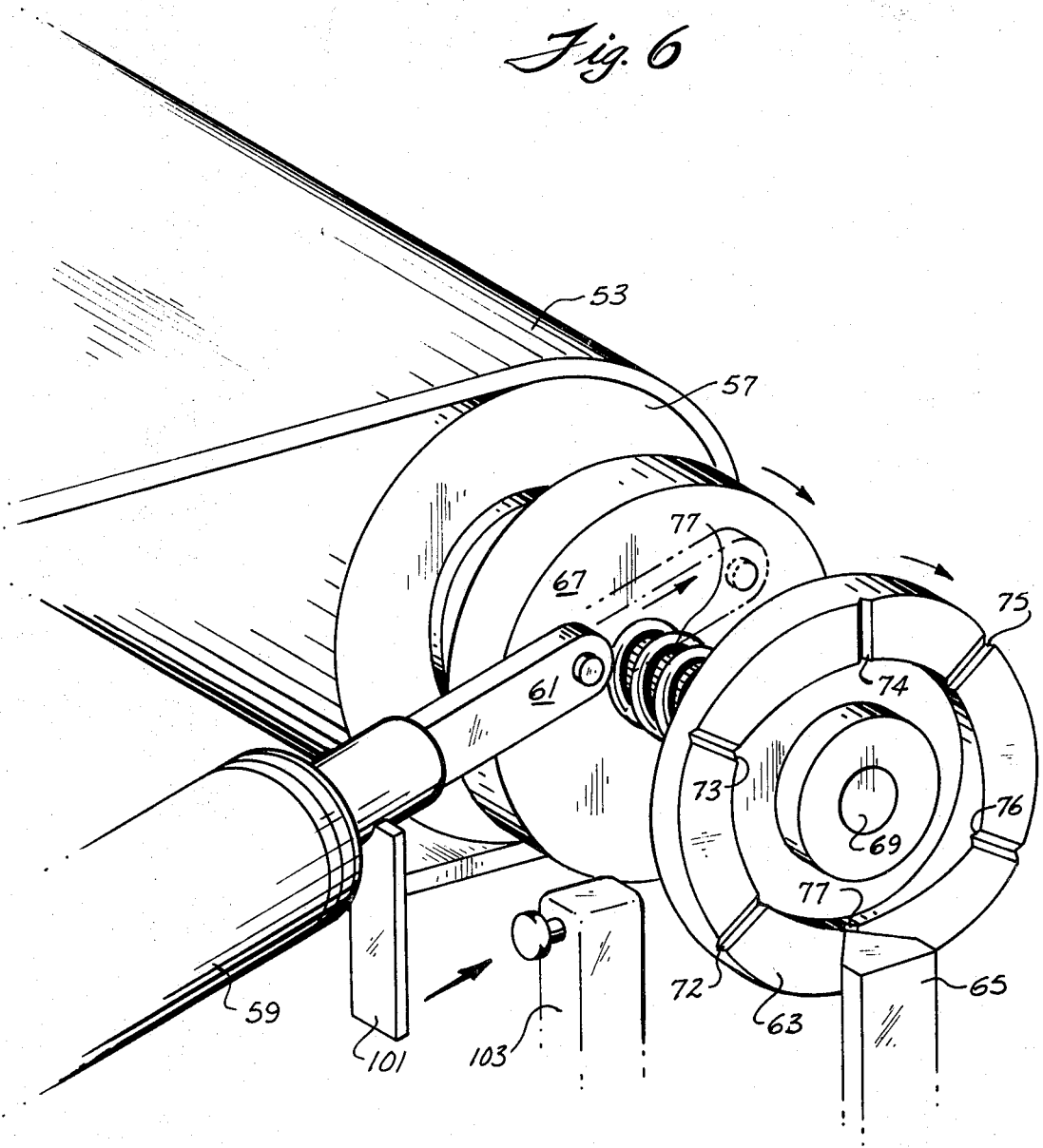

3,535,734
FLUID-OPERATED, FORCE-LIMITED APPARATUS FOR TENDERIZING MEAT
Henry M. Ross, The Lawn,
Nokesville, Va. 22123
Continuation-in-part of application Ser. No. 773,874, Nov. 6, 1968. This application Mar. 4, 1969, Ser. No. 804,106
Int. Cl. A22c 9/00
U.S. Cl. 17—25                                    10 Claims

ABSTRACT OF THE DISCLOSURE

A fluid-operated apparatus for tenderizing meat having a reciprocable head with closely-spaced, independently force-limited cutting elements disposed over a conveyor belt for severing the meat fibers with orthogonally oriented cuts as the meat is successively positioned by longitudinal and lateral movement of the conveyor belt. The cutting elements are pushed back into the head when bone or cartilage is encountered and a predetermined force is exceeded, thereby protecting them from damage.

CROSS REFERENCES TO RELATED APPLICATIONS

This application is a continuation-in-part of applicant's copending application "Fluid Operated, Force-Limited Apparatus for Tenderizing Meat," filed Nov. 6, 1968, Ser. No. 773,874, now abandoned.

BACKGROUND OF THE INVENTION

At the present time, the majority of meat butchered throughout the world is not suitable for broiling or roasting because of the toughness of the meat fibers. Such meat is typically prepared by long boiling or steaming, while in some instances it is ground or chopped into very small particles to facilitate further processing. Within the past twenty-five years, chemicals such as vegetable enzymes have been employed to break down the tough fibers. Although reasonably successful, these chemicals affect the taste of the meat adversely and frequently render a mushy consistency to the final product. Various mechanical methods, such as cube steak hammers, have been used for many years in an attempt to achieve similar results by crushing and tearing the fibers. These methods invariably result in greatly altered shape of the meat and they are suitable only for use on thin, boneless cuts.

Within more recent years, a number of mechanical tenderizing machines have appeared. These machines typically are equipped with a large number of rigidly-mounted knives or spring-biased spikes which are able to cut or pierce the tough fibers in handling somewhat thicker meat cuts.

In the case of knives which are sufficiently slender, the holes left by the knives will usually reseal themselves through natural protein combination and the fibers will, of course, remain cut. Thus, the appearance and general texture (other than toughness) are little altered. Unfortunately, knives which are sufficiently slender to accomplish this properly are very delicate and must be quite limited in length. The meat must also be fully boned and the cartilage removed to avoid structural failure of the blades. The cutting action of the multiple-bladed heads of such machines is generally random in nature, and, therefore, results in terms of tenderness are not consistent, but may vary significantly.

In the case of spring-biased spikes, the piercing action of the spikes tends either to alter the shape of the meat in much the fashion of cube steak hammers when the spikes are sufficiently numerous and closely spaced, or to be ineffective in breaking down the tough fiber structure.

In order to tenderize meat mechanically without changing its general shape and appearance, it is necessary to sever the fascia by means of knives of minimum cross section. Controlled tests as well as industry experience indicate that tearing and/or visible perforations will result when the thickness of the knife blade is increased much beyond .035" or its width is increased much beyond .125". The moment of inertia of such limiting cross sections is approximately $0.5 \times 10^{-6}$ inches.

When properly sharpened, such a blade will require a force of 2½ to 3 pounds to penetrate and properly sever the fascia of tough meat averaging 5 to 6 inches in thickness. (This thickness is typical of the primal cuts.) Obviously, such cuts would require a blade length close to 6 inches. The column buckling strength of such a blade is determined by its moment of inertia, its length, (both of which are dictated by the problem requirements), the modulus of elasticity of the blade material (which is approximately $3 \times 10^7$ pounds per square inch for all steel materials), and the end conditions, which are the means for securing the blade attachments. The end conditions for this problem are best described as one end fixed (where the blade is welded or mechanically fastened to the support structure) and the other end "rounded" (where the point enters the meat and approximates a "hinged" condition).

Since all of the factors governing buckling strength are defined by the nature of the problem itself, the buckling strength can be calculated using the well known Euler Column equation:

$$P = \frac{n\pi^2 EI}{1^2}$$

where:
P = critical buckling load in pounds
E = Young's modulus of elasticity
I = moment of intertia of column
1 = column length in inches
n = factor depending on end conditions (in this case n=2)

The value found is under nine pounds. This is the theoretical value based upon perfect concentric loading with no lateral forces applied. Since perfect concentric loading is almost impossible to achieve in a practical column, structural engineering codes would normally require a factor of safety equal to five or more to minimize the possibility of failure. This large factor of safety covers more than the usual material uncertainties and analytical inaccuracies which characterize other structural members. It provides for unavoidable eccentric loading. In the problem under consideration here, this factor of safety requirement can be relaxed (since human safety is not involved) but in no event would it be considered acceptable to go below a factor of 3.

Thus, there is an unusually restrictive operating force range dictated by a force of 3 pounds required to accomplish the task and a limiting force value of 3 pounds to prevent blade failure.

While these values could be varied slightly (by altering blade length, for example), it is important to note that this extremely narrow operating range is inherent in the problem. Shortening the blade length would make it impossible to process primal cuts and require that thinner sections be processed. The orientation of the fascia in slice cuts and thinner sections would be nearly parallel to the blade operating axis and thus cutting efficiency would be unacceptably reduced. Increasing blade cross section alters appearance and shape.

The problem can be solved practically only by a true force-limiting system and not by a spring-biased (spring rate) system which is, in fact, an increasing-force system, since, in a spring rate system, the force will increase as the blade is forced to retract as a natural consequence of Hooke's Law. The individual blades should be capable of exerting a piercing force of 3 pounds and yet retract for their full 6 inch length (whenever a resisting force greater than 3 pounds is encountered) so as to permit the adjacent blades to perform their function.

Even with an arbitrarily extended operating range attained by allowing the blade to begin retraction at 2½ pounds, a practical device still would not be realized. To illustrate, assume a lower range limit of 2½ pounds and an upper limit of 3 pounds. This imposes a spring rate requirement of:

3–2½ pounds/6 inches or 1/12 pound per inch.

Such spring would have to be compressed 30 inches (which is 2½ pounds divided by 1/12 pound per inch) in order to obtain the initial force of 2½ pounds. Additionally, it would be compressed 6 inches by the retraction stroke, or a total of 36 inches compression.

The technical problems in providing such a spring system include:

(1) The blade center to center distance must be kept as small as possible in order to obtain proper tenderizing, or large amounts of fascia will remain uncut. Center distances of approximately ¼ inch are required.

(2) The maximum outside diameter of springs which could be properly supported on ¼ inch centers would be 0.20 inch.

(3) The maximum permissible torsional stresses in springs designed for such applications would be limited by good practice of 50,000 pounds per square inch. For the purpose of this example 75,000 p.s.i. will be allowed.

(4) In order to limit stresses to 75,000 p.s.i. and allow a 36 inch stroke in a spring of the required diameter, approximately 1400 turns of .027 inch wire would be required. If these turns are closely wound, they would occupy 38 inches of length. However, they must be spread to allow for 36 inches of compression. Therefore, total spring length must be a minimum of 36 inches plus 38 inches, or 74 inches. When compressed to the starting force of 2½ pounds, it would still require a length of 44 inches. In such a spring, friction and binding between the sides and the restraining containing system would result in force variations as great or greater than the compressive forces.

(5) If stresses were limited to a more reasonable value of 50,000 p.s.i., rather than 75,000 p.s.i., spring length would be increased significantly further.

Thus, it is essential that a true force-limiting system be employed if a practical solution is to be had. A spring-rate system, which is not a force-limiting system, cannot result in a practical answer.

SUMMARY OF THE INVENTION

With these problems in mind, the present invention has for its principal object the provision of means for mechanically tenderizing deep cuts of meat without requiring prior removal of bones and cartilage. Another object of the invention is to provide a means for properly orienting and interspersing the cutting action of the mechanical apparatus to obtain thorough cutting of the meat fibers with consistent results.

The features of the invention are realized in a fluid-operated, vertically-reciprocable set of closely-spaced cutting elements disposed over a conveyor belt which is programmed for longitudinal and lateral movements as the cutting elements reciprocate vertically. The motions of the conveyor belt and the orthogonal orientation of the cutting edges of the cutting elements assure complete piercing of the meat and cutting of the meat fibers with consistent results. The cutting elements are protected from damage by utilizing independently movable cutting elements mounted in a fluid pressure head so that a constant fluid pressure acts on each cutting element to urge it to its lowermost position in the head. As the head is lowered to force the cutting elements through the meat, any cutting element which encounters bone or cartilage, thereby placing a predetermined resisting force on such element, is pushed back into the pressure head before the cutting element is damaged by excessive force.

BRIEF DESCRIPTION OF THE DRAWINGS

FIG. 2 is a perspective view showing the orientation of the comb members;

FIG. 3 is a cross-section of a portion of the pressure head showing the cutting elements in position;

FIG. 4 is a cross-sectional view of a portion of the pressure head and hold-down member showing a cutting element in position:

FIG. 5 is a diagrammatic plan view showing the configuration of incisions left by the cutting elements after longitudinal and lateral motions of the conveyor mechanism have been completed; and FIG. 6 is a perspective view showing the conveyor belt longitudinal and lateral drive mechanism.

DESCRIPTION OF THE PREFERRED EMBODIMENT

Figure 1:
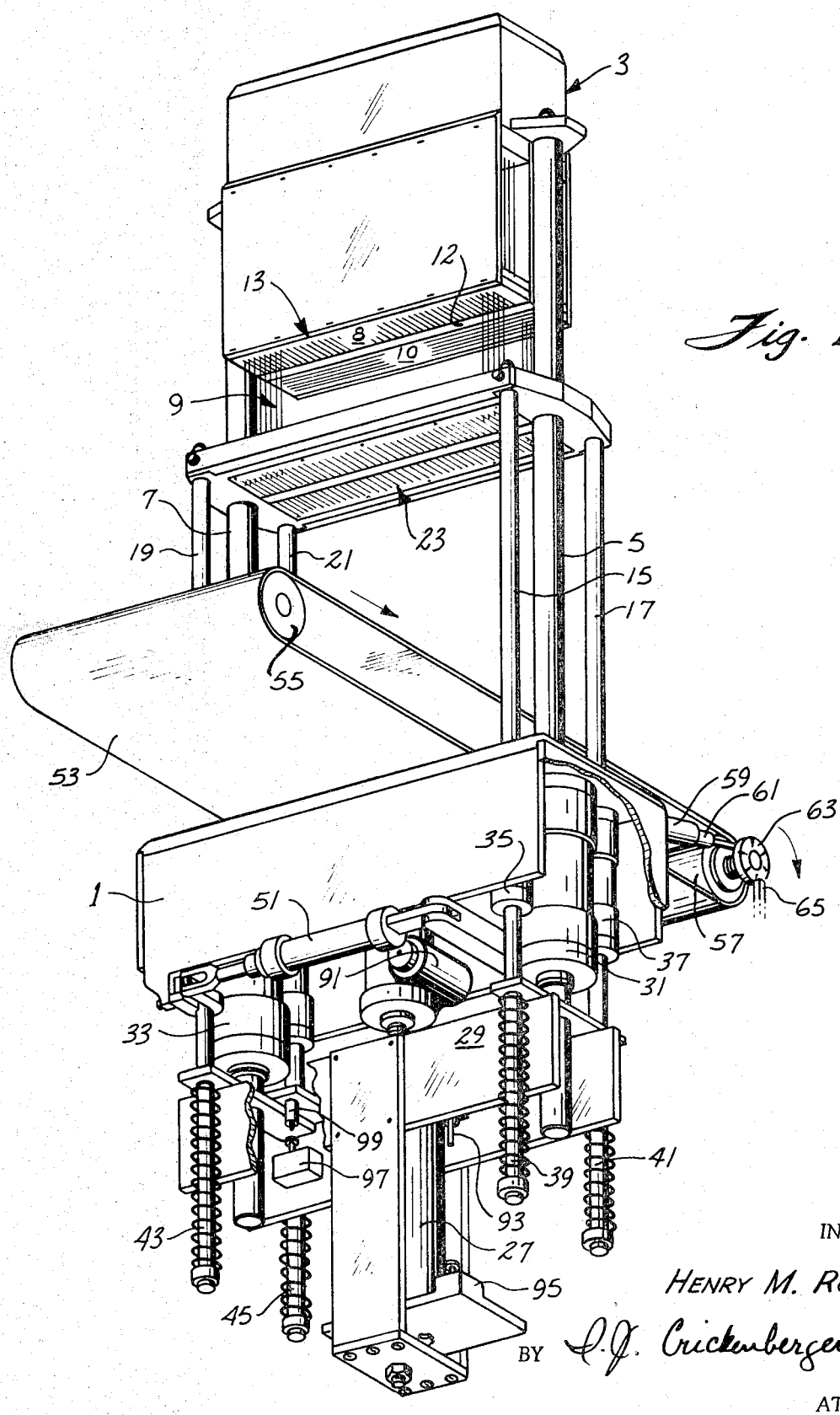
FIG. 1 is a perspective view of a preferred form of apparatus taken from below and with most of the enclosing cabinet structure removed.

The invention will be understood more readily by referring to the following description of the preferred embodiment of the invention shown in the drawings The perspective view of FIG. 1 is taken from below and with most of the enclosing cabinet structure of the apparatus removed. The cabinet 1 has mounted thereon a reciprocable pressure head 3 which is supported by a pair of head rod supports 5 and 7. Head rod support 7 has a hollow interior passageway to provide pressurized fluid from a source (not shown) within the cabinet to the reciprocable pressure head 3. The apparatus may be adapted to use any suitable fluid, but in the preferred embodiment air is utilized to provide a pneumatic apparatus.

A plurality of cutting elements shown generally at 9 depend from the lower surface of reciprocable pressure head 3 and project through upper guide 13. In the preferred embodiment there are 528 cutting elements arranged in 12 rows of 44 elements each and spaced on 0.275 inch centers. The cutting elements 9 are typically 0.030 inch thick, 0.1 inch wide and 6 inches long. Cutting elements 9 are arranged in two groups, designed generally as 8 and 10. The cutting elements within each group have their cutting edges in parallel relationship. The cutting edges of the elements in group 8 are disposed orthogonally with respect to the cutting edges of the elements of group 10. The groups 8 and 10 are separated by a divider plate 12.

Beneath the cutting elements 9 and depending from reciprocable pressure head 3 is a lower guide and hold-down member 23 which is mounted on and held in position by hold-down rod supports 15, 17, 19 and 21. Both upper guide 13 and lower guide and hold-down member 23 are provided with spaced apertures which coincide with the positioning of cutting elements 9 to provide free passage therethrough. The spaced apertures of the upper guide and hold-down member are formed by superposing a pair of comb members such as 14 and 16, shown in FIG. 2, so that the longitudinal tines 18 of comb 16 cross the transverse tines 20 to comb 14. With this construction the comb members are readily removable for easy cleaning. The orientation and orthogonal arrangement of the cutting elements can be seen readily from FIG. 3 which is an underside plan view of a portion of hold-down member 23 with the cutting elements in position.

The reciprocable pressure head 3 is operated by means of the head-operating cylinder 27 and yoke assembly 29. The head rod supports 5 and 7 pass through guide members 31 and 33 and suitable openings in lower guide and hold-down member 23. Guides 35 and 37 are provided for hold-down rod supports 15 and 17, respectively, and similar guides are provided for hold-down rod supports 19 and 21. Hold-down compression springs 39, 41, 43 and 45 are provided at the lower ends, respectively, of hold-down rod supports 15, 17, 19 and 21. When the yoke assembly 29 is driven downward by head-operating cylinder 27 to lower the reciprocable pressure head 3, the hold-down compression springs 39, 41, 43 and 45 force the lower guide and hold-down member 23 downwardly until it contacts the meat. The meat to be processed is thereby held in position while it is pierced by the cutting elements. Hold-down clamping cylinder 51 is provided to lock the lower guide and hold-down member 23 in its lowermost position while the pressure head 3 and cutting elements 9 are raised. This action prevents the meat from being displaced when the cutting elements are withdrawn.

FIG. 4 is a cross-sectional view of a portion of the reciprocable pressure head 3 and lower guide and hold-down member 23 showing a single cutting element 9′ in position projecting through combs 16′, 14′, 14 and 16. The cutting element 9′ is rigidly fixed to a cutting element piston shank 81 which serves as a stop to limit the downward travel of cutting element 9, since the shank 81 will not pass through the combs in upper guide 13. The cutting element piston shank 81 passes through guide bearing members 83 and 85, and a pressure seal is effected by O-ring seal member 87. The cutting element piston head 89 is exposed to the fluid pressure in reciprocable pressure head 3, and each cutting element contained in pressure head 3 is subjected to an equal downward force from the fluid pressure. This fluid pressure is selected to be less than one-half of the critical buckling load of the cutting elements even under the worst conditions. With this structure the force necessary to cause the cutting element piston shank 81 to be pushed back into the pressure head 3 is less than one-half of the force required to do damage to the cutting element itself, thereby providing a safety factor in excess of 2. As contrasted to rigidly mounted cutting elements, the cutting elements of the present device are independently force-limited such that any cutting element or combination of cutting elements which encounter resistance in downward travel are pushed back into the head undamaged, while the remaining cutting elements continue to pierce and sever the meat fibers as desired. This enables the processing of meat without removing the bone and cartilage.

For example, cuts of meat with a large bone in the center can be processed by utilizing several passes through the apparatus, turning the meat after each pass so that the entire piece has been pierced and the fibers severed. When this is done, the pressure head is not made to descend to the point where cutting elements 9 nearly contact the conveyor belt 53. Instead, they need to descend only through half the thickness of the meat to be processed, since the meat will be turned and the portion missed by the first pass will be subsequently covered. The depth of stroke of pressure head 3 may be adjusted by means of a worm-gear, screw-jack head adjustment 91, as shown in FIG. 1. The orientation of the meat fibers is not critical since the groups of cutting elements 8 and 10 are disposed with the cutting edges at right angles. The longitudinal and lateral motions of the meat thus cause a pattern of incisions as shown in FIG. 5 thereby insuring that no meat fibers escape the severing action as might be the case if all cutting edges were parallel.

The meat is positioned on conveyor belt 53 which passes over rollers 55 and 57. Conveyor belt 53 is capable of longitudinal motion when actuated by clutch cylinder 59 and driving link 61. Lateral motion may be introduced to the conveyor belt by means of cam 63 and stationary cam follower 65. This strucure is understood more readily by referring to FIG. 6 which is a perspective view showing the drive mechanism in detail.

An overrunning clutch indicated generally at 67 is mounted on roller shaft 69 to allow intermittent advance of conveyor belt 53 by clutch cylinder 59 and driving link 61. Cam 63, which is provided with six detent notches for indexing with stationary cam follower 65, furnishes the lateral motion to conveyor belt 53. The six detent notches 71 to 76 vary in depth by a distance $s$ for each alternate notch. This variation in depth forces the roller shaft 69 toward the machine center as a high notch is reached, and away from the machine center when a low notch is reached. A spring 77 provides the necessary outward bias for roller shaft 69. The length of stroke of driving link 61 does not have to be exact, and is made slightly less than the angular notch-to-notch increment. This permits stationary cam follower 65 to pull cam 63 into exact position by means of the detent notches. The distance $s$ is chosen to equal the center-to-center distance of the cutting element spacing so that the lateral displacement of the conveyor belt at the midportion is equal to $s/2$. The pressure head 3 is mounted to engage the meat at the midpoint of the conveyor belt 53.

The longitudinal increment of travel of conveyor belt 53 is determined by the angular displacement of the detent notches and the diameter of roller 57. The belt travel per cycle is made equal to $ns/2+s/2$, where $n$ equals the number of rows of cutting elements in the direction of travel and $s$ equals the center-to-center distance of cutting element spacing.

It will be appreciated from the longitudinal and lateral movements described with reference to the conveyor belt that in the piercing action of the cutting elements the elements of groups 8 and 10 are interspersed both laterally and longitudinally so that the center-to-center distance of each tenderizing cut is one-half of the center-to-center spacing of the cutting elements. The pattern of cuts shown in FIG. 5 displays this interspersing.

In operation, a piece of meat to be tenderized is placed on conveyor belt 53 and advanced to lie directly under reciprocable pressure head 3. Head-operating cylinder 27 is actuated to cause reciprocable pressure head 3 to descend, bringing with it the lower guide and hold-down member 23. The cutting elements 9 pierce the meat to be processed and when the bottom of the stroke is reached, signal valve actuator plunger 93 contacts signal valve 95 and initiates two actions. First, the hold-down clamping cylinder 51 is actuated to lock hold-down rod supports of lower guide and hold-down member 23 in position thereby maintaining guide member 23 at the point of meat contact. Second, the retraction of raising stroke of head-operating cylinder 27 is initiated to withdraw the cutting elements from the meat. The lower guide and hold-down member 23 which is clamped in position at this time prevent the meat from rising with the cutting elements as they are withdrawn. When pressure head 3 reaches its uppermost position, signal valve 97 is actuated by signal valve actuator plunger 99 to release the hold-down clamping cylinder 51 and permit the lower guide and hold-down member 23 to release the meat. Clutch cylinder 59 is also actuated to advance conveyor belt 53. As driving link 61 is actuated, the signal valve actuator 101 contacts signal valve 103 to initiate downward operation of head-operating cylinder 27 and a new repetitive cycle follows.

It will be appreciated from the foregoing description that the use of vertically-reciprocable, closely-spaced, slender knives in orthogonally disposed groups operating in conjunction with a conveyor mechanism having programmed longitudinal and lateral motions results in a meat product in which substantially all of the fascia and tough fibers have been severed without visibly altering the appearance of the meat. The use of fluid-operated knife elements produces a true force-limiting system in which the knives are protected from damage when bone is encountered, thereby enabling the use of sufficiently slender knives.

What is claimed is:

1. An apparatus for tenderizing meat comprising:
   support means for supporting meat to be tenderized,
   a plurality of cutting elements comprising relatively thin blades with cutting edges for piercing and cutting said meat, and
   means for mounting each of said cutting elements for independent, force-limited insertion into said meat,
   whereby any cutting elements which encounter a predetermined resisting force upon insertion into said meat will be protected from damage.

2. The combination according to claim 1 wherein said support means comprises:
   conveyor means for moving said meat past said cutting elements.

3. The combination according to claim 2 comprising:
   means for advancing said conveyor means a predetermined longitudinal distance.

4. The combination according to claim 2 comprising:
   means for moving said conveyor means a predetermined lateral distance.

5. The combination according to claim 1 wherein:
   said plurality of cutting elements have cutting edges disposed in orthogonal relationship.

6. The combination according to claim 1 wherein:
   said means for mounting said cutting elements comprises:
   a movable pressure head member for directing a constant fluid pressure to each individual cutting element to urge said cutting element to its lowermost position in said pressure head member,
   said individual cutting elements being slidably mounted in said pressure head member so that each can be pushed back into said pressure head member upon encountering a predetermined resisting force in said meat as said pressure head member descends.

7. The combination according to claim 6 comprising guide means for said cutting elements.

8. The combination according to claim 6 comprising:
   hold-down means for holding said meat in position on said support means while said cutting elements are being removed.

9. The combination according to claim 6 comprising:
   means for advancing said support means a predetermined longitudinal distance.

10. The combination according to claim 9 comprising:
    means for moving said support means a predetermined lateral distance.

References Cited

UNITED STATES PATENTS

| | | | |
|---|---|---|---|
| 110,111 | 12/1870 | Bringman | 17—25 |
| 2,559,270 | 7/1951 | Abbott | 17—25 |
| 3,256,801 | 6/1966 | Greenspan | 17—25 X |

LUCIE H. LAUDENSLAGER, Primary Examiner